US006588152B2

(12) United States Patent
Cabbane

(10) Patent No.: US 6,588,152 B2
(45) Date of Patent: Jul. 8, 2003

(54) APPARATUS FOR ASSEMBLY OF A WINDOW ON A WINDOW REGULATOR

(75) Inventor: Damien Cabbane, Fontainebleau (FR)

(73) Assignee: ArvinMeritor Light Vehicle Systems-France, Sully-sur-Loire (FR)

( * ) Notice: Subject to any disclaimer, the term of this patent is extended or adjusted under 35 U.S.C. 154(b) by 0 days.

(21) Appl. No.: 09/921,450

(22) Filed: Aug. 2, 2001

(65) Prior Publication Data

US 2002/0020117 A1 Feb. 21, 2002

(30) Foreign Application Priority Data

Aug. 4, 2000 (FR) ........................................... 00 10307

(51) Int. Cl.[7] ................................................... B60J 1/17
(52) U.S. Cl. ........................................... 49/375; 49/374
(58) Field of Search .......................... 49/375, 374, 372, 49/348, 349

(56) References Cited

U.S. PATENT DOCUMENTS 3,930,339 A * 1/1976 Jander ......................... 49/352
4,730,414 A * 3/1988 Nakamura et al. ............ 49/348
4,910,917 A * 3/1990 Brauer ........................ 49/348
5,729,930 A 3/1998 Schust et al.
5,987,820 A * 11/1999 Shibanushi .................. 49/358
6,205,711 B1 3/2001 Klippert
6,408,574 B1 * 6/2002 Farrar et al. .................. 49/358
6,453,617 B1 * 9/2002 Klippert et al. ............... 49/375

FOREIGN PATENT DOCUMENTS

DE 196 53 046 A 6/1998

OTHER PUBLICATIONS

INPI Preliminary Search Report dated Apr. 25, 2001.

* cited by examiner

*Primary Examiner*—Gregory J. Strimbu
(74) *Attorney, Agent, or Firm*—Carlson, Gaskey & Olds

(57) ABSTRACT

A system for positioning and assembling a mobile element on a drive system includes an adapter element fixed to the mobile element. The adapter element has a first extension in line with the mobile element and a second extension in the longitudinal direction of the mobile element. The system further includes a slider element including a third extension in the longitudinal direction of the mobile element. The third extension cooperates with the second extension. The slider element and a confining element cooperate with a fixation member to lock the first extension of the adapter element between the slider element and the confining element.

22 Claims, 4 Drawing Sheets

APPARATUS FOR ASSEMBLY OF A WINDOW ON A WINDOW REGULATOR

BACKGROUND OF THE INVENTION

The present invention relates to a system for the positioning and assembling of a mobile element on a drive system, and more particularly of a vehicle window on a window regulator.

The assembly of a window on a window regulator has, for a long time, been a delicate operation and numerous solutions have been proposed for improving assembly and positioning of the window in its supporting system.

It is essential to obtain small tolerances of positioning of the window with respect to the window regulator, as small tolerances allow a good adjustment of the window in the seals of the door in raised position and, for example, reduce the problems of tightness, air noises or vibrations of the window at high speed.

In order to reduce these tolerances and to ensure correct assembly of the window with respect to the different adjacent fixed elements, it is necessary to be able to adjust the position of the window on the window regulator, particularly in the longitudinal direction of the vehicle, before fixing the window definitively on said window regulator.

U.S. Pat. No. 5,729,930 describes a system for adjustably assembling the window in the longitudinal direction of the vehicle and is applicable to a window presenting a hole allowing a protuberance defined by said Patent to be housed therein.

The subject matter of this U.S. Patent presents several drawbacks, consisting, in particular, in the fact that the window must be provided with a hole and must be able to withstand the pressure exerted by the two clamping parts, which is not always compatible with the windows used, whether it be due to the type of window used, such as the window without hole, or due to the material used for manufacturing the window, for example so-called laminated windows which do not withstand either the holes or the pressure.

Another drawback of this known system of assembly is that the fixation means is only accessible from the so-called wet side of the vehicle door, this raising problems of accessibility for the person responsible for assembly in the case of the window regulator being fixed on the door before the window is definitively positioned, and for the operator in charge of changing the window in the event of the latter being defective.

For example, in order to ensure correct positioning of the window before it is definitively fixed, one can proceed as follows: the adapters are stuck on the window, then the window is inserted in the door so that the adapters are placed on the sliders of a window regulator. The window is then pushed in abutment against the vertical upright of the vehicle door, and thereafter, is mounted in raised position. During this ascending movement, the window will be positioned in the longitudinal direction with respect to the vertical upright of the door, the adaptors having, at this stage, the possibility of being translated longitudinally with respect to the sliders. If, when the window is in raised position, the sliders are hidden, for example by a bar reinforcing the door, the window cannot be fixed definitively in this position. The window must therefore be lowered by a certain amount, while conserving its position with respect to the sliders, in order to be able to be fixed definitively.

In the case of the system of assembly disclosed by U.S. Pat. No. 5,729,930, the accessibility of the fixation means raises problems for the manipulator, as the clamping element is only accessible from the wet side of the door.

It is an object of the present invention to overcome these drawbacks.

SUMMARY OF THE INVENTION

In a system for positioning and assembling a mobile element such as a window on and with a drive device such as a window regulator of an automobile vehicle, of the type comprising a so-called adapter element fixed to the mobile element or window, a slider element guided in at least one rail fast with a vehicle door and driven by a drive device housed in said door, a confining element and a fixation means capable of connecting the adapter, the slider and the confining element, the adapter being held between said slider and said confining element, the object of the invention is attained in that:

- the adapter presents a first substantially vertical extension in line with the mobile element or window as well as a second extension in the longitudinal direction of the mobile element or window,
- the slider is provided with a third extension in the longitudinal direction of the window, with at least one guide block fast with an element of the drive device and guided along a rail, as well as with a vertical wall comprising a contact surface capable of cooperating with one of the faces of the first extension of the adapter of which the second extension cooperates with the third extension of the slider so as to allow a slight relative movement between the adapter and the slider, under the action of a longitudinal force applied to the window before fixation thereof,
- the confining element comprises a second contact surface, and
- the fixation means cooperates with the confining element so as to block the first extension of the adapter between said first and second contact surfaces.

The invention thus allows the window to be adjusted in the longitudinal direction of the vehicle thanks to the action of the third extension of the slider on the second extension of the adapter. This contact creates a force capable of maintaining the mobile element in its definitive position before its final fixation, effected by said first extension of the adapter being held between the two contact surfaces and the action of the fixation means. It is possible to use one sole system according to the invention, but the hold of the mobile element or window is better ensured with two systems.

As mentioned hereinabove, the invention relates more particularly to the assembling of a mobile window of a vehicle on a window regulator.

The adapters may be fixed on the mobile element or window by clamping or clipping, for example through holes made in the window, if the properties of the material or the shape of the window allow this.

According to an advantageous characteristic, the adapters are fixed on the window by adhesion, in order to satisfy the requirements of the type of windows used, such as so-called laminated windows.

In certain cases, the second extension may advantageously be constituted by two parts which form a clamp in order best to hold the third extension of the slider. These two parts of the clamp may also be provided with hooks to allow drive of the window during lowering thereof before it is definitively fixed.

According to a particular characteristic, the third extension is drawn out or elongated in the longitudinal direction of the window, in order to allow a considerable translation of the adapter along this third extension.

According to another characteristic, the third extension is constituted by a substantially cylindrical part, which facilitates introduction of the third extension between the two parts forming clamp and constituting the second extension.

The contact surfaces of the second extension of the adapter and those of the third extension of the slider are advantageously provided with substantially vertical teeth.

This characteristic makes it possible to increase the force of hold of the slider in the second clamp-shaped extension by action of the teeth of the two extensions imbricating in one another.

The teeth made on the third extension of the slider may be constituted by a thread, which makes it possible to use an element connected to said slider.

At least one of the faces of the first extension is provided with substantially horizontal teeth, and at least one surface of the first contact surface and/or of the second contact surface, opposite the face of the first extension, is provided with teeth substantially parallel to the teeth of the first extension.

This characteristic makes it possible to increase the force of hold of said adapter between the contact surfaces, by pressure between the teeth, thanks to the fixation means and limits the possibility of tear of the adapter from the holding system.

The particular shape of the teeth allows the first extension to be coupled between the slider and the confining element and prevents accidental uncoupling of the first extension.

According to a particular characteristic, the slider is provided with a tongue and the confining element is pierced with a hole to allow passage of said tongue. This characteristic facilitates pre-hold of the confining element by the slider before definitive fixation by said fixation means.

The slider is pierced with at least one first hole to allow passage of the fixation means towards the confining element.

The assembly constituted by a slider and a confining element may be made in one piece. The pivotal mobility of the confining element with respect to the slider is produced thanks to the elasticity and the shape of the connection of said confining element with said slider. This has the advantage of reducing the number of components and of facilitating positioning of the confining element with respect to the slider.

The adapter is pierced with a recess, located opposite the first hole of the slider, to allow passage of the fixation means.

According to a particular characteristic, the confining element is pierced with at least one second hole preferably located opposite the first hole of the slider to allow passage of the fixation means. The confining element may also be pierced on its outer face with a third hole, located in line with the recess of the adapter, to house and hold a part of the fixation means. In particular, the third hole may present the shape of a nut, in the case of the fixation systems being screw-nut systems, the screw being accessible from the dry side of the vehicle door.

Where the fixation means is constituted by a self-tapping screw, this screw will pass in the first hole and will be screwed in the second hole. This type of screw enables the number of components to be reduced.

According to another characteristic, the slider is provided with stops which serve as bearing for the lower edge of the first extension of the adapter when the adapter and therefore the window are positioned on the slider. Another advantage when there are at least two systems according to the invention per window, is that one of the adapters comes into abutment on the corresponding slider, while the other adapter is not necessarily in abutment on the second slider, which allows the angular clearance in the plane of the window to be taken up.

Another advantage of the invention consists in that the fixation means may be positioned by one side or by the other with respect to the window.

BRIEF DESCRIPTION OF THE DRAWINGS

The invention will be more readily understood on reading the following description of a non-limiting embodiment, with reference to the accompanying drawings, in which.

DETAILED DESCRIPTION OF THE PREFERRED EMBODIMENT

Figure 1:
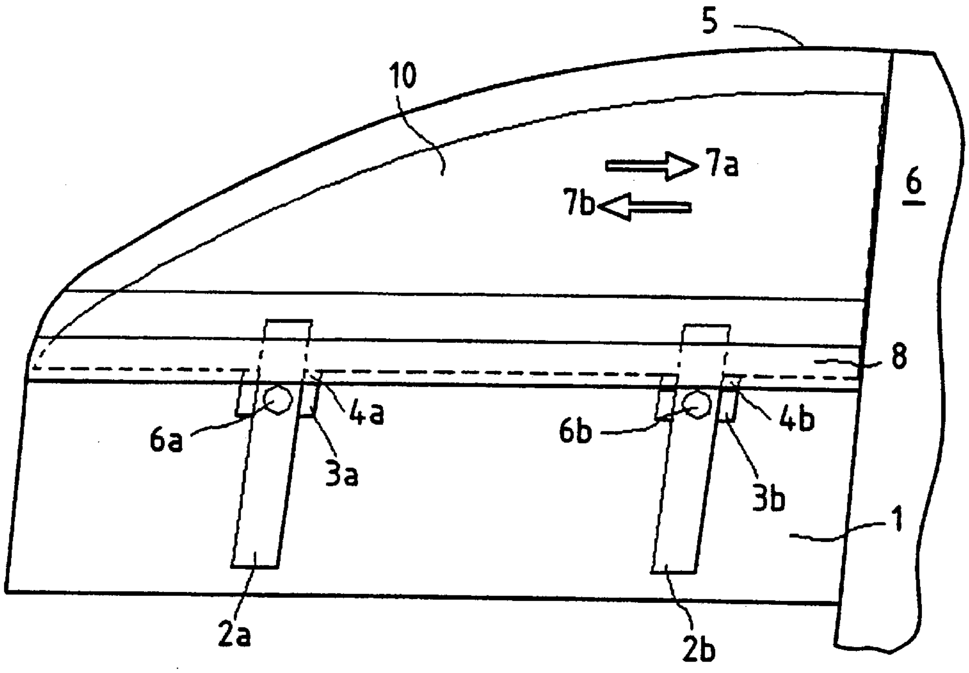
FIG. 1 shows the system of positioning and assembling according to the invention, in its environment.

Referring now to the drawings, and firstly to FIG. 1 which shows the invention in its environment, a vehicle door 1 is conventionally fitted with two rails 2*a*, 2*b* on which slide the sliders 3*a*, 3*b*, and adapters 4*a*, 4*b* on which a window 10 is mounted.

The window is previously fixed on adapters 4*a*, 4*b*, for example by clamping and/or by clipping and/or by adhesion, then these adapters are engaged in the sliders 3*a*, 3*b*. In order to place the window 10 in position, the manipulator places the window 10 in abutment against the vertical upright 6 of the door 1, pushing the window 10 in the direction of arrow 7*a*, i.e. towards the right in FIG. 1. The manipulator then displaces the window 10 upwardly, thanks to a conventional drive device (not shown) constituted in particular by cables and a motor. While the window 10 is being raised, the adapters 4*a*, 4*b* may slide with respect to said sliders 3*a*, 3*b* horizontally and parallel to the door 1 in the direction of arrow 7*b*, opposite that of arrow 7*a*.

The rails 2*a*, 2*b* are slightly inclined with respect to the vertical upright 6 of the door 1, the angle included between a rail 2*a* or 2*b* and the upright 6 presenting an apex located above the door 1. In this way, the window 10 is urged against the vertical upright 6 while it is being raised. The window 10 is then pushed by said vertical upright 6 towards the left in the direction of arrow 7*b*. In effect, the force of reaction exerted by the vertical upright 6 on the window according to the invention is greater than the force of retention exerted by a special structure of the system according to the invention, which allows horizontal slide of the window. When the window comes into abutment against the horizontal member 5 of the door, it may be said that it is in its definitive position.

In this raised position, a reinforcing bar 8 of the door 1 sometimes prevents access to the fixation means (not shown in this Figure). The window must therefore be lowered a few centimeters so that said fixation means become accessible to the manipulator, through bores 6*a*, 6*b* made in the rails 2*a*, 2*b*; said fixation means are then fixed definitively. While it is being lowered, the window undergoes no effort in the direction of arrow 7*b*, as said vertical upright 6 no longer acts on the window 10, and the special structure according to the invention allows the window to be held in its optimum position, defined by its raised position.

Figure 2:
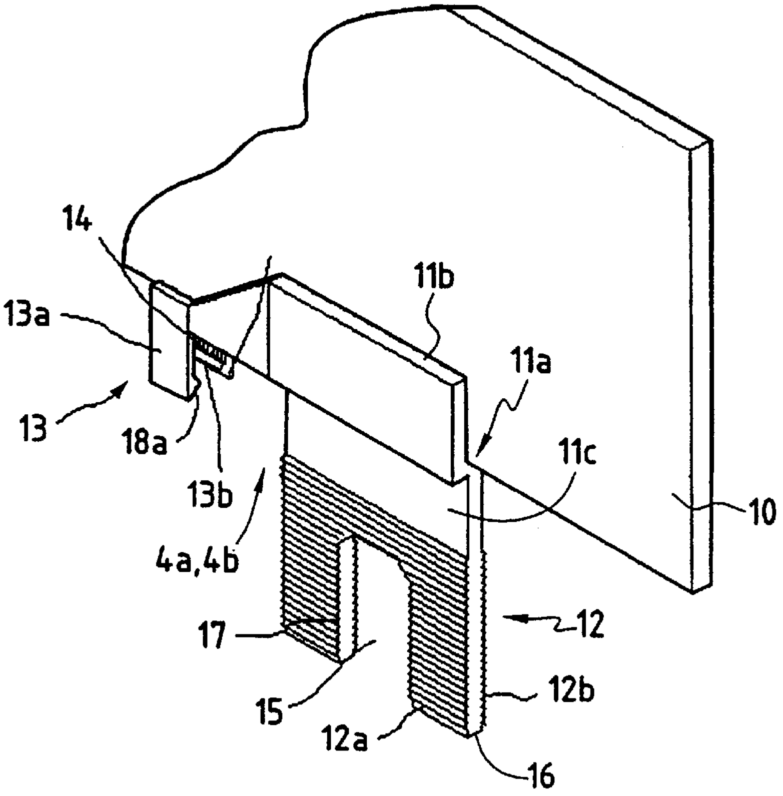
FIG. 2 shows an isometric view of the window and of its adapter according to the invention.

FIG. 2 shows an adapter 4*a* or 4*b* stuck to the window 10 which rests on a horizontal shoulder 11*a* provided between an upper wall 11*b* and a lower wall 11*c* of the adapter 4*a*, 4*b*. The lower wall 11*c* of the adapter 4*a*, 4*b* is extended downwardly by a first substantially vertical extension 12 comprising two parallel faces 12*a*, 12*b* provided with horizontal teeth 17, in order to improve hold of the adapter 4*a*, 4*b* on the corresponding slider (3*a* or 3*b*), after final fixation of the window 10. The lower extension or first extension 12 comprises a recess 15 to allow passage of a fixation means described hereinbelow and lies substantially in line with the window 10, this extension 12 terminating in a lower edge 16.

The adapter 4*a* or 4*b* comprises a second extension 13 extending horizontally, for example, towards the left in FIG. 2, in line with the upper wall 11*b* of the adapter 4*a* or 4*b* and is constituted by two parts 13*a*, 13*b* forming a clamp. On the inner faces of this clamp 13*a*, 13*b* are formed vertical teeth 14 which increase the force of hold of the adapter 4*a* or 4*b* on the slider 3*a* or 3*b*. Located at the bottom of the two parts 13*a*, 13*b* of the second extension 13, there are provided hooks 18*a*, 18*b* which serve to maintain the adapter coupled to the slider during the lowering of the system before definitive fixation thereof.

Figure 3:
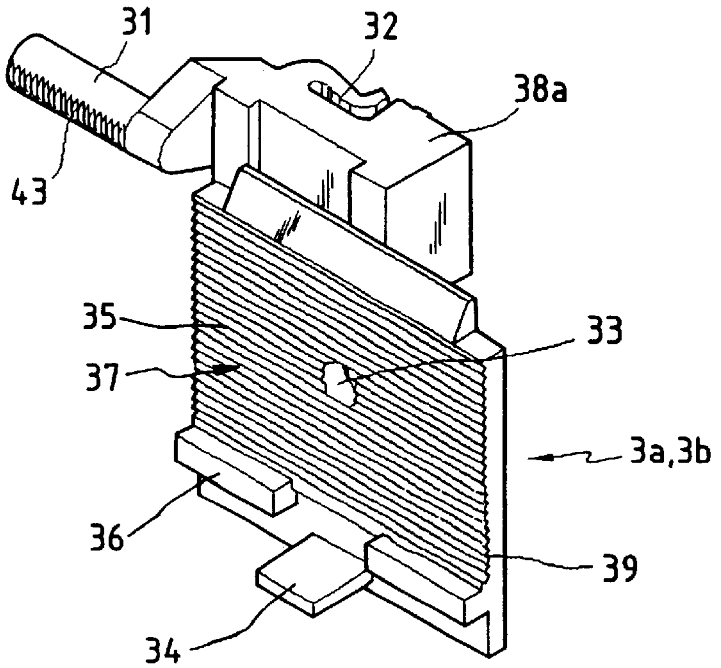
FIG. 3 shows an isometric view of the slider according to the invention.
Figure 6:
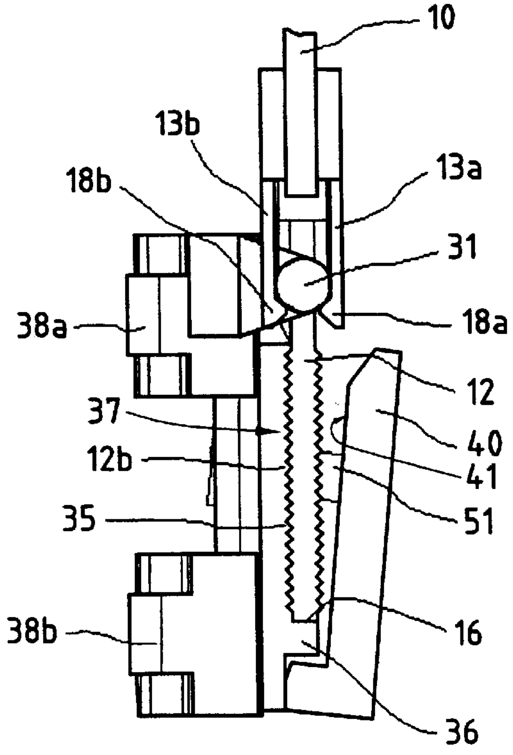
FIG. 6 shows a side view in elevation of the system according to the invention before definitive fixation of the window.

FIGS. 3 and 6 show a slider 3*a* or 3*b* according to the invention. This slider 3*a* or 3*b* comprises a vertical wall 37 and two superposed vertical guiding blocks 38*a*, 38*b* fast with said wall 37.

The vertical wall 37 also comprises, on the other side with respect to the blocks 38*a*, 38*b*, a contact surface 35 on which horizontal teeth 39 have been formed, intended to cooperate with the teeth 17 of the vertical face 12*b* of the first extension 12 during definitive fixation. In the lower zone and below the teeth 39, the wall 37 presents lateral stops 36 which project with respect to said wall 37 and against which bears the lower end 16 of the first extension 12 of the adapter 4*a* or 4*b* during assembly, as indicated in FIG. 6. A central tongue 34 which is preferably elastic and fast with the lower end of the wall 37 is located at a level lower than that of the stops 36 and serves as pre-hold for a confining element 40 on the slider 3*a* or 3*b*, as may be seen in FIG. 5. A bore 33 made in the central part of the wall 37 allows passage of a fixation means 50, 51. When the fixation means is constituted by a screw, this bore 33 must be of sufficient diameter to allow the angular clearance of the screw 51 during tightening, as is represented in FIG. 6.

The principal role of the guiding blocks 38*a* and 38*b* is to connect the slider 3*a* or 3*b* to the corresponding rail 2*a* or 2*b* and to guide the slider 3*a* or 3*b* therealong. To that end, each of the superposed blocks 38*a*, 38*b* presents a guiding housing 32 in which a corresponding rail 2*a* or 2*b* is introduced, with the result that the slider 3*a* or 3*b* may slide freely along said rail, being driven by a drive cable (not shown) which is conventionally fixed on one of the superposed blocks 38*a* or 38*b*.

The upper block 38*a*, i.e. the slider 3*a* or 3*b*, comprises a horizontal extension 31, called third extension, which extends, in FIG. 3, towards the left in the longitudinal direction of the window 10. This third extension 31 is substantially cylindrical and lies at least approximately in the horizontal extension of the plane of the wall 37. This cylindrical extension 31, also called "third extension", bears, on the same side as the teeth 39 of the wall 37, vertical teeth 43 which cooperate with the inner teeth 14 of the two parts 13*a*, 13*b* of the second extension 13 of the adapter 4*a* or 4*b* before definitive assembly.

A cylindrical shape has been chosen for this third extension 31, but other shapes may be adopted, provided that they allow a horizontal translation of the adapter 4*a* or 4*b* with respect to the corresponding slider 3*a* or 3*b*.

Another extension, identical to extension 31, may be disposed symmetrically on the other side of the slider 3*a* or 3*b*. This other extension makes it possible, in the event of problem of tolerances, for at least one of the two extensions 31 to clip in one of the two clamps, each constituted by the two parts 13*a*, 13*b* of the second extension 13 which, in this particular case, is provided in duplicate respectively on each lateral end of the upper wall 11*b* of the adapter 4*a* or 4*b*.

The teeth 43 made on the cylindrical extension 31, are substantially vertical, but they may take particular shapes such as for example that of a thread.

Figure 4:
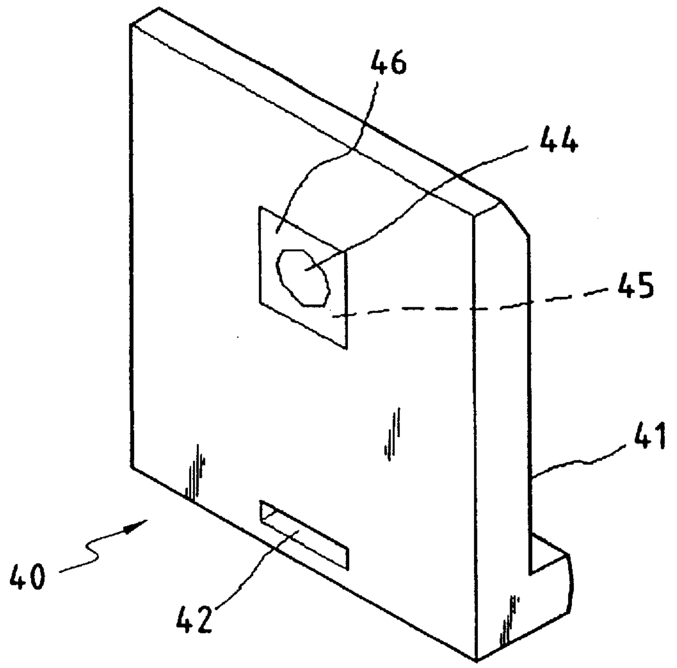
FIG. 4 shows an isometric view of the confining element according to the invention.

FIG. 4 shows a confining element 40 which, in vertical section, is L-shaped with a long vertical side and a horizontal flange of short length approximately equal to the thickness of the vertical side, this horizontal flange being placed below stops 36 of the slider 3*a* or 3*b*, when the latter is brought towards the confining element 40. In the central part of the lower end of the element 40, the horizontal flange of the latter is interrupted and the vertical side comprises a hole 42 of rectangular section intended to receive the horizontal tongue 34 of the slider 3*a* or 3*b*. The vertical wall of the confining element 40 comprises, in its approximately central zone, a cylindrical hole 44 substantially in register with the bore 33 of the slider 3*a* or 3*b* so as to allow the passage of a fixation means 50 comprising in particular a screw 51. In accordance with the example shown, the fixation means 50 also comprises a nut 46 inserted in a recess 45 in the element 40, not visible because of the nut, said recess 45 having the shape of the nut 46, which is maintained in place during tightening of the element 40 in the direction of the wall 37 of the slider 3*a* or 3*b*.

According to an advantageous embodiment, the fixation means 50 comprises a self-tapping screw. In that case, the nut 46 and its housing constituted by the recess 45 do not exist and the diameter of the hole 44 is chosen in order to allow engagement and coupling of the screw 51 in said hole 44.

The inner contact surface 41 of the confining element 40 shown in FIG. 6 is smooth in order to increase the pressure exerted by the latter on the adapter 4*a* or 4*b*, but this inner contact surface 41 may also be provided with teeth identical to teeth 39 of the slider 3*a* or 3*b*, or it may also be the only one to be provided with teeth while the contact face 35 of the vertical wall 37 of the slider 3*a* or 3*b* remains smooth.

Figure 5:
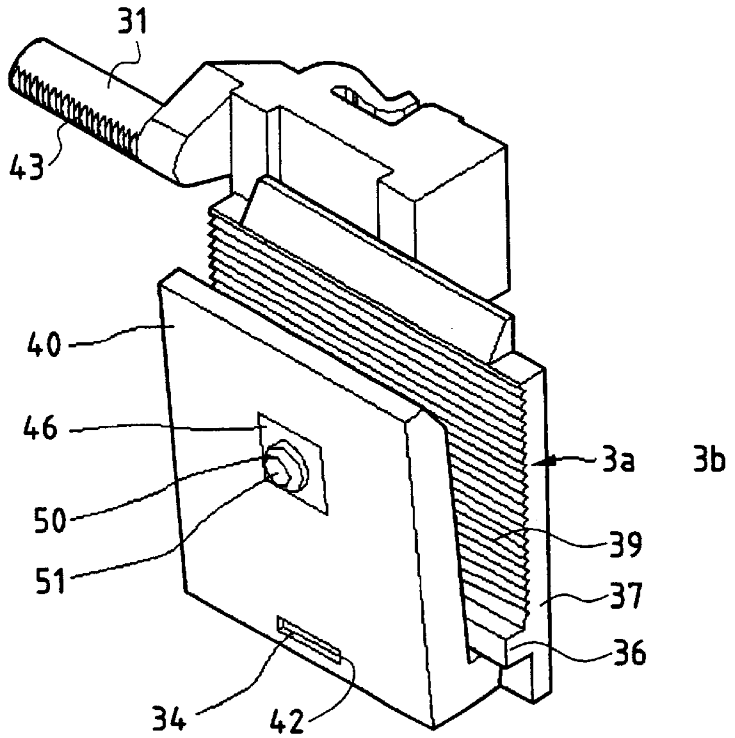
FIG. 5 shows an isometric view of the slider and of the confining element assembled in accordance with the invention.

FIG. 5 shows the pre-assembly of the slider 3*a* or 3*b* and of the confining element 40. The fixation means 50, of which the nut 46 and the end of the screw 51 are visible here, and the introduction of the tongue 34 of the slider 3*a* or 3*b* in the hole 42 of rectangular section of the confining element 40, allow a pre-hold or pre-assembly of the two elements, slider 3*a* or 3*b* and confining element 40. The screw 51 is not yet screwed completely in the nut 46 to allow the introduction of the adapter 4*a* or 4*b* between the two contact surfaces 35, 41 respectively of the slider and of the confining element. In that case, the screw 51 passes through the hole or notch 15 in the adapter, said hole presenting to that end a downward opening and being defined by faces in the form of an upturned U.

At that stage, it may be imagined that the two elements, the slider 3*a* or 3*b* and the confining element 40, constitute an adjustable and supple assembly at the point of the connection between the slider and the confining element.

FIG. 6 shows the system in pre-assembled position, the adapter 4*a* or 4*b* being introduced in the space between the contact surfaces 35, 41 of the slider 3*a* or 3*b* and of the confining element 40. The cylindrical extension 31 of the slider 3*a* or 3*b* is clipped between the walls or vertical parts 13*a*, 13*b* forming clamp and constituting the second extension 13 of the adapter 4*a* or 4*b*. The hooks 18*a*, 18*b* of the extension 13 cooperate with the cylindrical extension 31 in order to maintain the adapter 4*a* or 4*b* in position with respect to the slider 3*a* or 3*b* during lowering of the window 10 before definitive fixation thereof. The lower edge 16 of the first vertical extension 12 of the adapter 4*a* or 4*b* comes into contact with the lower stops 36 of the slider 3*a* or 3*b*. The screw 51 is also noticed, which is inclined by an angle given by the confining element 40, hence the interest in providing, in the slider, a bore 33 which is sufficiently large, in the vertical direction, to allow the angular clearance of said element 40.

Where there is only one system per window 10, the lower edge 16 of the adapter 4*a* or 4*b* comes into contact with the stops 36 of the slider 3*a* or 3*b*. However, in general, there are two systems per window 10, one at the front and the other at the rear in the longitudinal direction of the window 10. In that case, it is possible that one of the adapters comes into contact with the stops 36, while the other does not. This makes it possible to make up for an angular clearance in the plane of the window 10.

Figure 7:
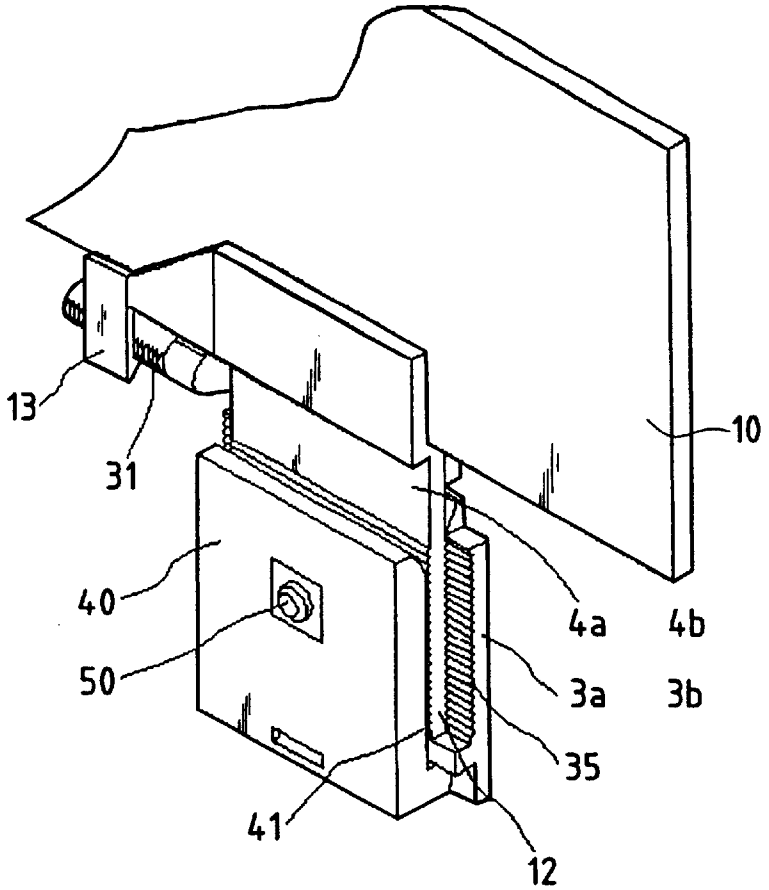
FIG. 7 shows an isometric view of the system according to the invention after definitive fixation of the window.

FIG. 7 shows the system in its final functioning position. The fixation means 50 is actuated up to its final clamping position and the contact surfaces of the different elements then come into contact with one another, which allows the definitive fixation of the adapter 4*a* or 4*b* between the slider 3*a* or 3*b* and the confining element 40.

Figure 8:
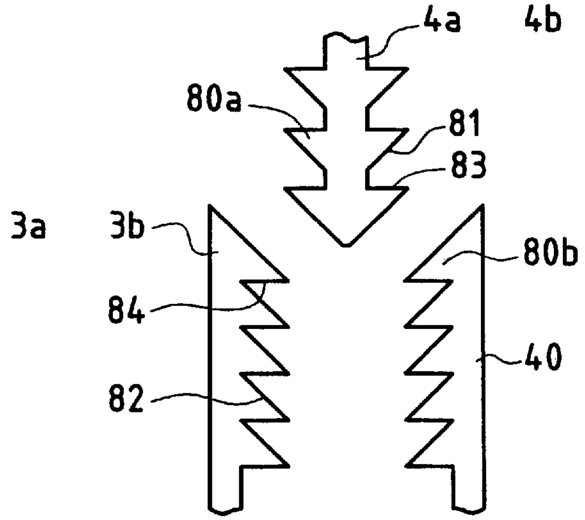
FIG. 8 shows a particular form of toothing of the adapter, slider and confining element that may be used within the framework of the invention.

FIG. 8 shows a variant of tooth shapes that may be used in the system according to the invention, in particular concerning the shape of the teeth 39 of the slider 3*a* or 3*b*, and of the teeth 17 of the adapter 4*a* or 4*b*. Triangular teeth need the same effort to position the adapter or withdraw it, which may raise problems when the window 20 is lowered, before definitive fixation. In effect, the window 10 may be jammed in the seal located along the reinforcement of the door. This is why it may be necessary to be able to increase the force of extraction of the adapter 4*a* or 4*b* thanks to a particular shape of the teeth.

Profiles of teeth 80*a* may replace those of teeth 17 of the adapter 4*a* or 4*b* and profiles 80*b* may replace those of teeth 39 of the slider 3*a* or 3*b* and/or of the confining element 40. The inclinations 81 and 82 of the teeth 80*a* and 80*b* cooperate in order to facilitate positioning of the adapter 4*a* or 4*b*, while the horizontal faces 83 and 84 of the teeth 80*a* and 80*b* cooperate in order to prevent accidental withdrawal of the adapter 4*a* or 4*b* before final fixation, such withdrawal being able to occur, for example, if the window 10 is blocked in the seals of the door.

The modus operandi of the system for positioning and assembling a window 10 on a window regulator will be briefly described hereinbelow, this description being made more particularly with reference to FIG. 1.

In the vehicle door 1, there are conventionally provided two rails 2*a*, 2*b* on which slide two sliders 3*a*, 3*b* to which are attached cables passing through a set of pulleys and driven by a motor (not shown).

As indicated hereinbefore, the window 10 is previously fixed on adapters 4*a*, 4*b*, for example by clamping and/or by clipping and/or by adhesion, these adapters then being engaged in the sliders 3*a*, 3*b*. To position the window 10, the manipulator places said window 10 in abutment against the vertical upright of the door 1, pushing the window 20 in the direction of arrow 7*a*, i.e. towards the right in FIG. 1. The manipulator then displaces the window 10 upwardly, thanks to a conventional drive system (not shown) constituted in particular by cables and a motor. While the window 10 is being raised, the adapters 4*a*, 5*b* may slide with respect to said sliders 3*a*, 3*b* horizontally and parallel to the door 1 in the direction of arrow 7*b*, opposite that of arrow 7*a*.

The rails 2*a*, 3*b* are slightly inclined with respect to the vertical upright 6 of the door 1, the angle included between a rail 2*a* or 2*b* and the upright 6 presenting an apex located above the door 1. In this way, the window 10 is urged against the vertical upright 6 while it is being raised. The window 10 is then pushed by said vertical upright 6 in the direction of arrow 7*b*. In effect, the force of reaction exerted by the vertical upright 6 on the window 10 is greater than the force of retention exerted by the second extension 13 on the cylindrical extension 31, which allows slide of the adapter 4*a* or 4*b* and therefore of the window 10. When the window comes into abutment against the horizontal upright 5 of the door 1, it may be said that it has been adjusted in its definitive position.

In this raised position, a reinforcing bar 8 for the door 1 sometimes prevents access to the fixation means 50 (not shown in this Figure). The window 10 must therefore be lowered a few centimeters for said fixation means to become accessible to the manipulator, through bores 6*a*, 6*b* made in the rails 2*a*, 2*b*, said fixation means 50 then being definitively fixed. During this lowering, the window 10 undergoes no effort in the direction of arrow 7*b*, as the vertical upright 6 no longer acts on the window 10, and the action of the extension 13 on the cylindrical extension 31 allows the window 10 to be held in its optimal position, defined by its raised position, and the hooks 18*a*, 18*b*, shown in FIG. 2, allow, by their action on the extension 31, drive of said window 10 and its adapters 4*a*, 4*b* by the sliders 3*a*, 3*b*.

The embodiment described may be subjected to a certain number of modifications within the scope of the person skilled in the art without departing from the scope of protection defined by the accompanying claims and having regard to the description and to the drawings.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A system comprising:

a mobile element;

an adapter element fixed to the mobile element, said adapter element including a first substantially vertical extension coplanar with the mobile element, a second substantially horizontal extension extending generally perpendicularly away from said first extension in a longitudinal direction of the mobile element, and at least said first extension having a plurality of adapter teeth;

a slider element guided by at least one rail secured to a vehicle door and driven by a drive device, and said slider element includes a third extension extending in the longitudinal direction of the mobile element, at least one guide block guided along said at least one rail, and a vertical wall defining a first contact surface, and said second extension of the adapter element cooperates with the third extension of the slider element to allow slight relative movement between the adapter element and the slider element under the action of a longitudinal force applied to the mobile element before fixation of the slider element to the adapter element;

a confining element that defines a second contact surface, and the adapter element is held between the slider element and the confining element, and at least one of the first contact surface and the second contact surface has a plurality of confining teeth that are substantially parallel to the plurality of adapter teeth and that cooperate with the plurality of adapter teeth; and a fixation member extending through and connecting the adapter element, the slider element and the confining element, and the fixation member cooperates with the confining element to secure the first extension of the adapter element between the first contact surface of the slider element and the second contact surface of the confining element by urging the adapter teeth and containing teeth to interengage.

2. The system of claim 1, wherein the adapter element is fixed on the mobile element by adhesion.

3. The system of claim 1, wherein the second extension is defined by two parts forming a clamp.

4. The system of claim 3, wherein the two parts are hooks.

5. The system of claim 1, wherein the third extension is drawn out in the longitudinal direction of the mobile element.

6. The system of claim 1, wherein the third extension is substantially cylindrical.

7. The system of claim 1, wherein the second extension and the third extension each include a contact surface having substantially vertical teeth.

8. The system of claim 7, wherein the vertical teeth of the third extension are threaded.

9. The system of claim 1, wherein the plurality of adapter teeth are shaped to couple the first extension between the slider element and the confining element and to prevent accidental uncoupling of the first extension therefore.

10. The system of claim 1, wherein the slider element includes a tongue and the confining element includes a hole for the passage of said tongue.

11. The system of claim 1, wherein the slider element and the confining element constitute a single flexible piece.

12. The system of claim 1, wherein the slider element includes at least one first hole.

13. The system of claim 12, wherein the adapter element includes a recess located opposite the first hole.

14. The system of claim 12, wherein the confining element includes at least one second hole opposite the first hole.

15. The system of claim 1, wherein the confining element includes at least one hole on an outer face thereof to hold part of the fixation member therein.

16. The system of claim 15, wherein a nut is housed in the hole.

17. The system of claim 16, wherein the fixation member is a self-tapping screw.

18. The system of claim 1 wherein the plurality of adapter teeth are substantially horizontal.

19. The system of claim 1 wherein said drive device is a window regulator.

20. The system of claim 1 wherein said mobile element is a window.

21. The system of claim 1, wherein the slider element includes at least one stop.

22. The system of claim 21, wherein a lower edge of the adapter element abuts said at least one stop.

* * * * *

UNITED STATES PATENT AND TRADEMARK OFFICE

CERTIFICATE OF CORRECTION

PATENT NO. : 6,588,152 B2
DATED : July 8, 2003
INVENTOR(S) : Cabbane

It is certified that error appears in the above-identified patent and that said Letters Patent is hereby corrected as shown below:

Column 9,
Line 41, of the patent, "containing" should be -- confining --.

Column 10,
Line 15, of the patent, "therefore" should be -- therefrom --.
Line 32, of the patent, "16" should be -- 1 --.

Signed and Sealed this

Eighteenth Day of November, 2003

JAMES E. ROGAN
*Director of the United States Patent and Trademark Office*